Figure 1:
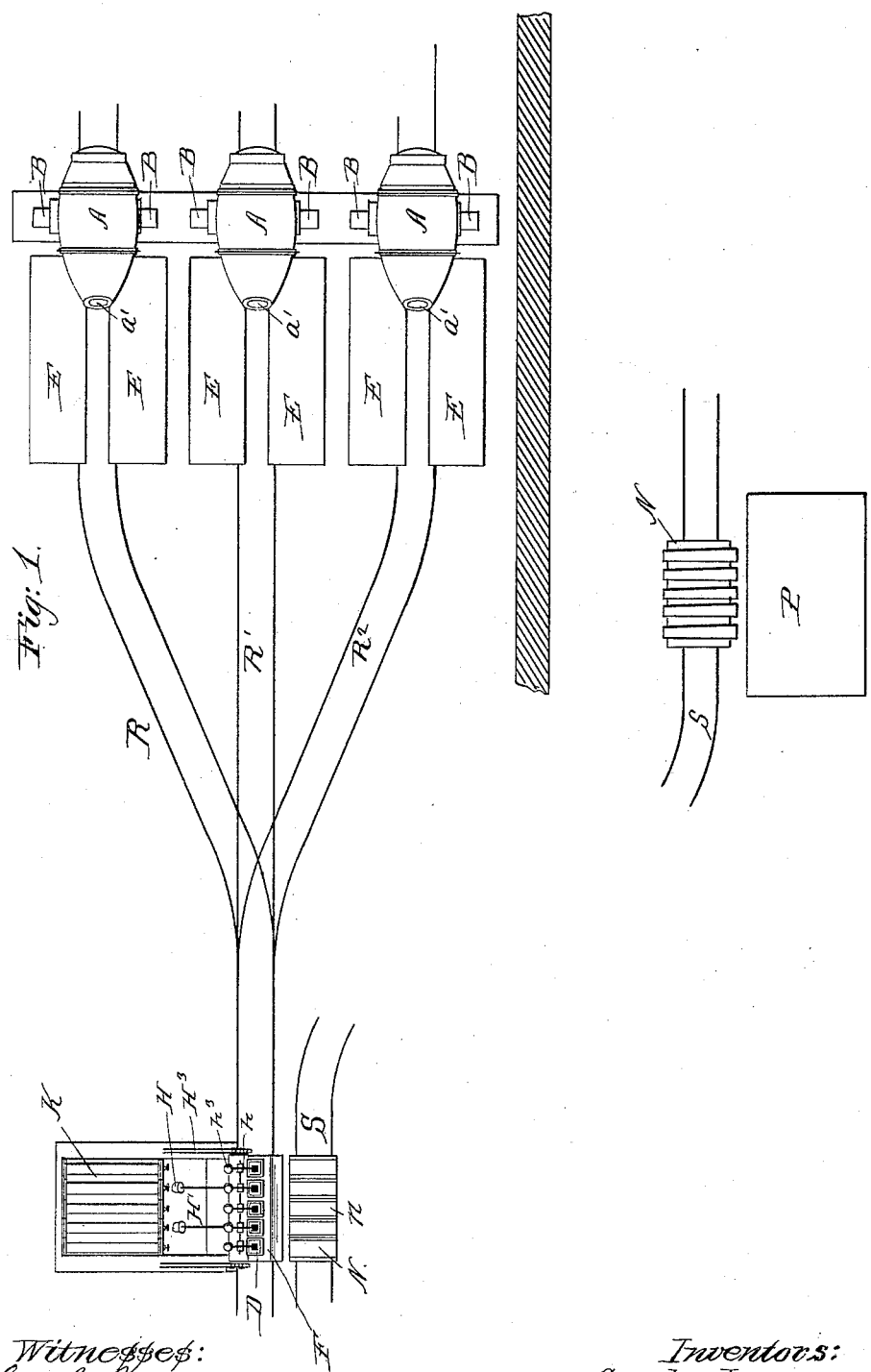

(No Model.) 7 Sheets—Sheet 1.

C. LAW & C. E. HOWE.
APPARATUS FOR THE MANUFACTURE OF STEEL.

No. 405,422. Patented June 18, 1889.

(No Model.) C. LAW & C. E. HOWE. 7 Sheets—Sheet 2.
APPARATUS FOR THE MANUFACTURE OF STEEL.
No. 405,422. Patented June 18, 1889.

(No Model.) 7 Sheets—Sheet 3.
C. LAW & C. E. HOWE.
APPARATUS FOR THE MANUFACTURE OF STEEL.
No. 405,422. Patented June 18, 1889.
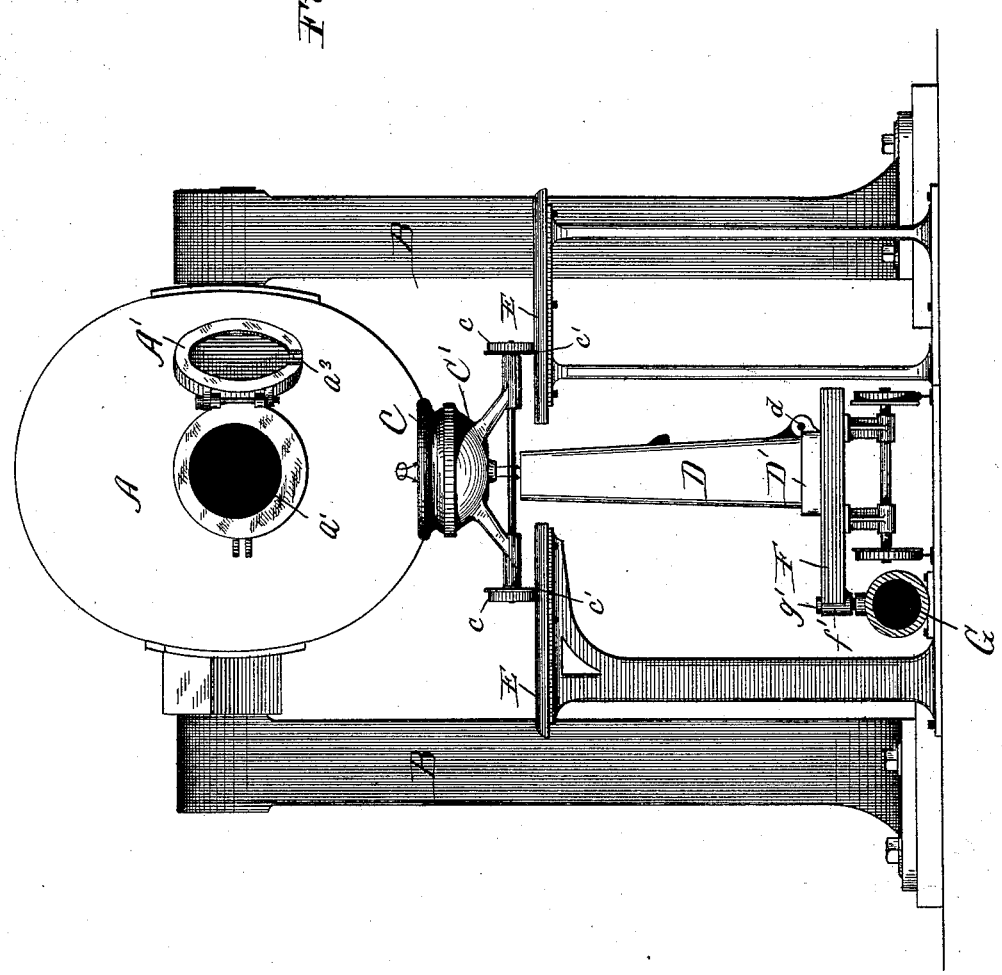

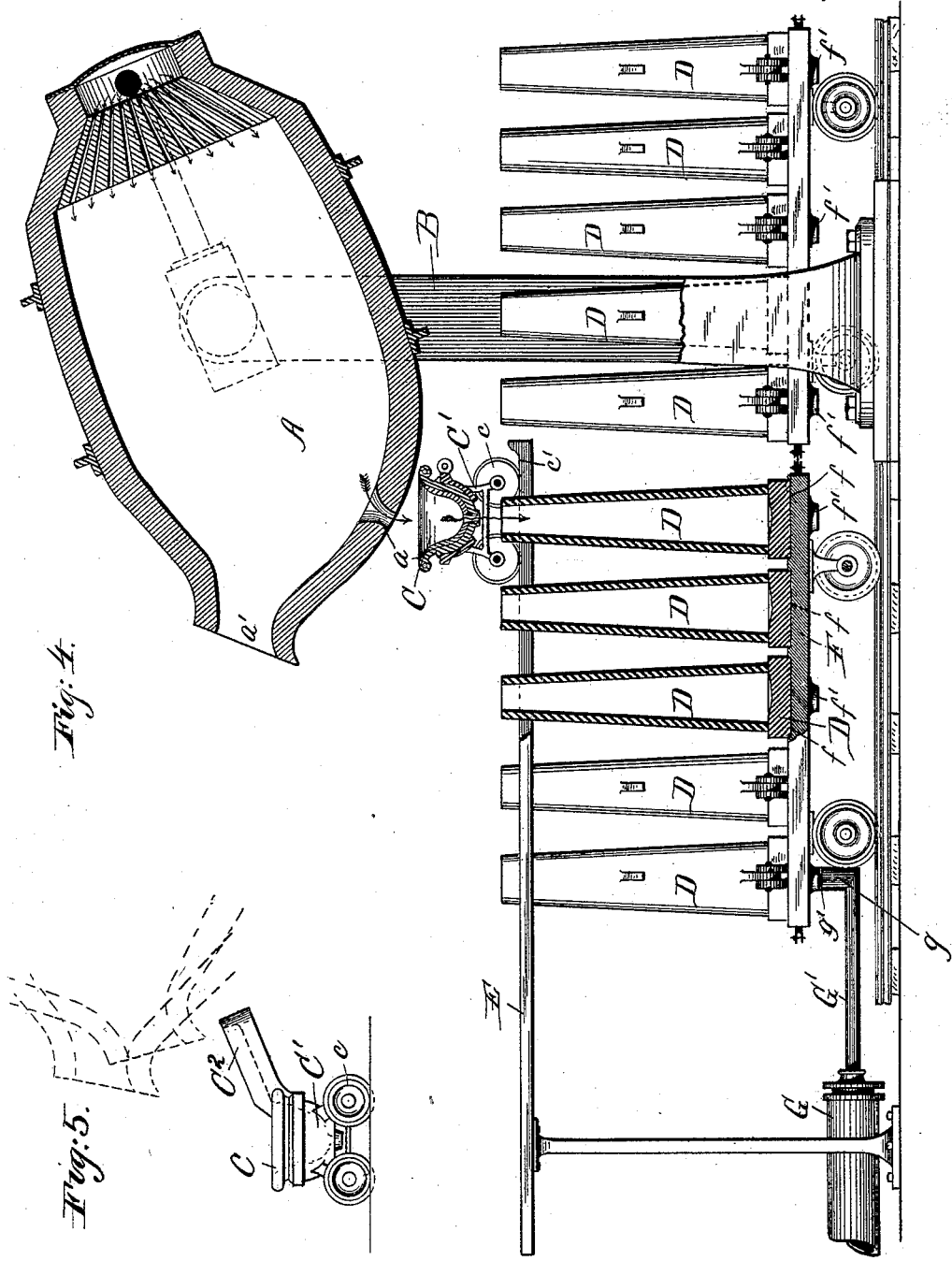

(No Model.) 7 Sheets—Sheet 5.

C. LAW & C. E. HOWE.
APPARATUS FOR THE MANUFACTURE OF STEEL.

No. 405,422. Patented June 18, 1889.

Witnesses:
Sew. C. Curtis.
H. M. Munday.

Inventors:
Crossley Law.
Charles E. Howe.
By Munday, Evarts & Adcock
their Attorneys (No Model.) 7 Sheets—Sheet 6.
C. LAW & C. E. HOWE.
APPARATUS FOR THE MANUFACTURE OF STEEL.
No. 405,422. Patented June 18, 1889.
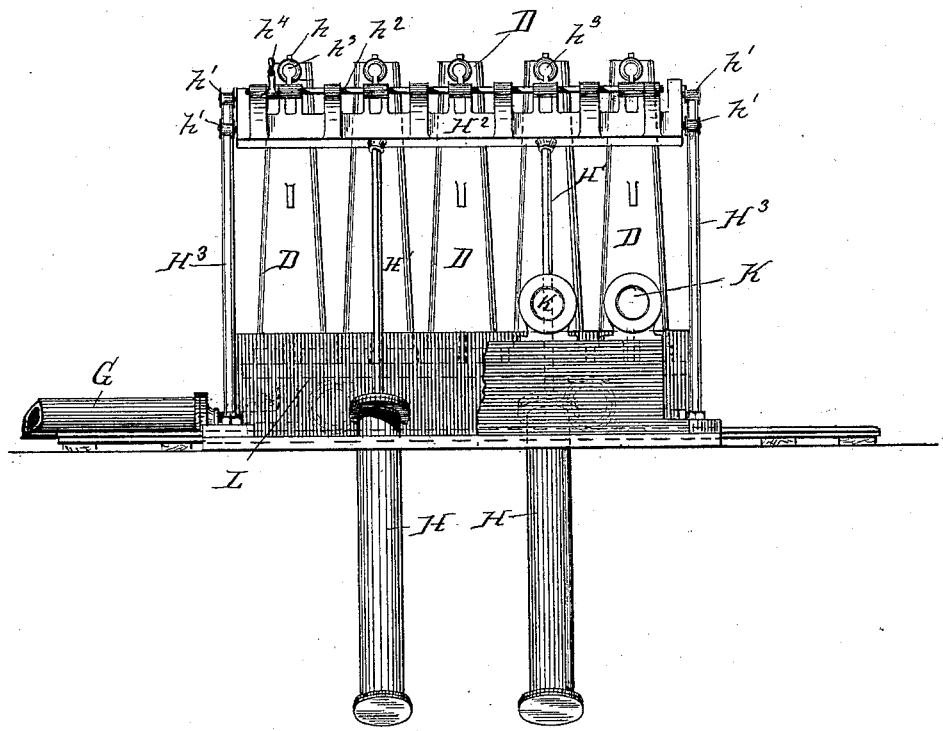
Fig: 7.
Witnesses
Lew. C. Curtis.
H. M. Munday.
Inventors:
Crossley Law
Charles E. Howe
By Munday, Evarts & Adcock
their Attorneys (No Model.) 7 Sheets—Sheet 7.
C. LAW & C. E. HOWE.
APPARATUS FOR THE MANUFACTURE OF STEEL.
No. 405,422. Patented June 18, 1889.
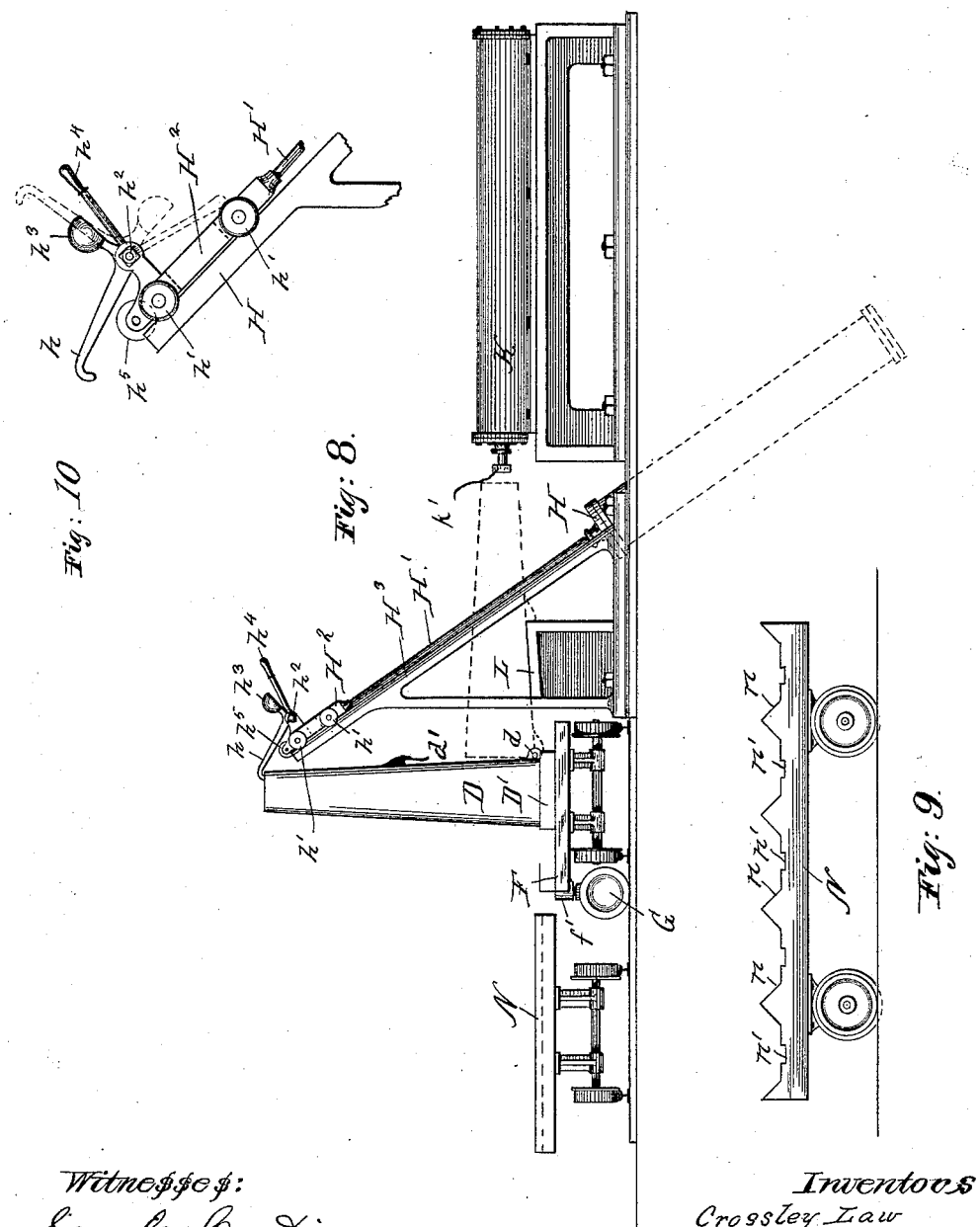

UNITED STATES PATENT OFFICE.

CROSSLEY LAW AND CHARLES E. HOWE, OF SOUTH CHICAGO, ASSIGNORS OF ONE-TENTH TO ENOCH WARD, OF CHICAGO, ILLINOIS.

APPARATUS FOR THE MANUFACTURE OF STEEL.

SPECIFICATION forming part of Letters Patent No. 405,422, dated June 18, 1889.

Application filed December 18, 1888. Serial No. 293,957. (No model.)

*To all whom it may concern:*

Be it known that we, CROSSLEY LAW and CHARLES E. HOWE, citizens of the United States, residing in South Chicago, in the county of Cook and State of Illinois, have invented a new and useful Improvement in Apparatus for the Manufacture of Steel, of which the following is a specification.

Our invention relates to the casting and handling of steel ingots preparatory to rolling the same into railroad-rails or other forms.

In the plant heretofore employed or generally in use the molds in which steel ingots are cast are planted in a circle about the periphery of a large pit about fifty feet in diameter and five and a half feet in depth. Generally about thirty molds, each about six feet high, square in form and tapering toward the top to form an ingot weighing about one ton, are thus planted in the pit. In the center of the pit is arranged a powerful crane, by means of which a large pouring-ladle is swung from one mold to another. This pouring-ladle is generally adapted to hold the entire charge of the converter, or on an average about ten tons of molten metal. Ordinarily a plant of three converters are arranged side by side at a short distance from the pit. Between the pit and the converters a second crane, commonly called the "receiving-crane," is located. The ladle is supported by this receiving-crane while the molten steel is being poured from the converter into the ladle, and then the ladle is transferred by means of a hydraulic ram from the receiving-crane to the pouring-crane at the center of the pit, which latter crane is technically known as the "ram." Sometimes, where a plant of only two converters is employed, the receiving-crane is omitted, as the pouring-crane or ram at the center of the pit may be made to carry the ladle into position for receiving the charge of molten steel from each of two converters by swinging it in opposite directions. After the steel becomes set or sufficiently cool, the square tapering molds are lifted or drawn off the steel ingots and placed on a car by means of a crane located at one side of the pit, and after this the ingots are in like manner lifted out of the pit and placed on another car and then conveyed to the furnace of the rail-rolling department. Two cranes are ordinarily employed on opposite sides of the pit for lifting the molds and ingots out of the pit and for replacing the molds into the pit preparatory to repeating the casting operation.

In practice it is customary to employ a plant of three converters and a pit holding thirty molds, so that the three operations of pouring, removing the molds and ingots from the pit, and replacing the molds in the pit may all be carried on simultaneously. While the contents of one converter are being poured into one set of ten molds from the ladle operated by the ram or crane at the center of the pit, another set of ten molds is being planted in another part of the pit by one of the outside cranes, and at the same time still another set of ten molds is being stripped from the ingots, lifted out of the pit onto the car, and the recently-cast ingots removed from the pit by the other exterior crane, so that the operation is carried on continuously. A force of about sixty-five men, usually called "pitmen," is in this old plant ordinarily employed to keep the pit in order, plant the molds therein, remove the molds and ingots from the pit and place them upon the cars, and operate the several cranes. In this old plant the heat of this pit is very great and almost unbearable, owing to the picket or wall of hot molds and recently-stripped ingots standing upright in the pit around its periphery and to the great mass of molten steel in the pouring-ladle, the men, though inured to the work, often falling to the ground overcome by the heat, and although they work but eight hours per day in the summer months they rarely are able to make full time on account of the severity of the work and the intense heat. This old process is also fraught with great danger to the several gangs of men employed to do this work, owing to the pouring of this great mass of molten metal from the huge ladle, its transportation to the casting-pit, and the repeated handling of the molten steel in the pouring-ladle, and also from the manner of handling the heavy and hot molds and ingots. Frequently also serious loss is occasioned by reason of the men being overcome in their work at some critical stage in the pouring operation, or from other cause failing to perform their respective duties in the required time. It will be understood that after the steel is poured from the converter into the pouring-ladle it will remain at the proper temperature and fluidity for pouring but a comparatively short time. Another difficulty and expense incident to the old plant for making these large steel ingots is the time, labor, and materials required to keep the great pouring-ladles in repair, as the molten metal, especially when being poured from the converter into the molds, tends to destroy the refractory lining of the ladle. Ordinarily a force of about eight men is required to keep the pouring-ladles in repair, a set of ten or more ladles being employed for a single pit, so that the repairing operation may go on continuously. On an average the pouring-ladle requires to be relined with loam or other refractory material once about every twelve or fifteen heats, and the expense incident to one relining is about sixty dollars. The ladles themselves are also frequently destroyed. From this it will be understood that in the practical operation of the old process the repairing or keeping the great pouring-ladles in condition is of itself alone a matter of considerable importance.

In the old plant the slag which floats on top of the molten metal in the converter is in part left in the converter after the molten steel has been poured into the ladle through the mouth of the converter; but part of the slag flows into the ladle and floats on the top, the steel being drawn out of the ladle into the molds through a hole in the bottom of the ladle, so that the slag may remain in the ladle. After the heat is poured, the slag remaining in the ladle is dumped into the pit and remains there until cooled sufficiently for handling, thus adding materially to the heat of the pit and the discomfort of the men.

It is the object of our invention to provide a plant or means of casting heavy steel ingots and of handling the molds and ingots preparatory to the reheating and rolling or future manipulation of the ingots, whereby the danger to the workmen, the excessive heat to which they are exposed, and much of the labor and expense incident to the old plant may be avoided and the ingots cast and handled with great speed and facility; and more particularly it is the object of our invention to provide a plant whereby the pit, the pouring-ladle, and the cranes for transferring and handling the pouring-ladle, and for handling the ingots and molds, as well as the labor of the force of about sixty-five pitmen, cranemen, and ladle-repairers, may be entirely dispensed with.

Our invention consists in the plant, means, or apparatus we employ to accomplish this result.

In our plant, no pit or pouring-ladle being employed, we pour the molten steel directly from the converter into the molds, a suitable bowl, funnel, or runner being used to properly guide the stream of molten metal from the pouring hole or lip of the converter into the mold. The molds are mounted upon a movable carriage or car traveling upon a track or way extending under the converter, the car being moved to bring the molds one after another in place under the converter by a hydraulic ram or other suitable means. The pouring of the molten steel directly from the converter into the molds is done preferably through a pouring-hole in the belly of the converter. After the entire charge of molten steel in the converter is thus poured directly from the converter into the series of molds on the movable car, the next step, according to our invention, is to move or run the mold-car out or away from the converter, and as soon as the steel becomes set or sufficiently cooled turn the molds from their erect position down into an approximately horizontal position, when the ingot is pushed horizontally through the mold and thus stripped or extracted therefrom, the ingot being at the same time and by this same stripping operation delivered in a horizontal position upon another car. The still hot ingots are by this second car conveyed directly to the furnace of the rail-rolling department, where the ingots are reheated preparatory to the rolling operation.

The molds are preferably hinged to the bed of the car upon which they are mounted, and the means which we ordinarily employ for tilting the molds down into a horizontal position is a hydraulic ram, the piston of which is furnished with hooks or grappling devices for engaging the upper end of the mold. This hydraulic ram is mounted in an inclined position. The means which we prefer to employ for pushing the ingot out of the mold onto the furnace-car is a similar hydraulic ram mounted in a horizontal position. After the ingot is thus extracted from the mold and delivered upon the furnace-car, the molds are again lifted or turned into their upright position on the car by means of the same hydraulic ram by which they were lowered.

The number of molds upon each car may be varied; but we prefer to employ about five molds upon each car, so that a series of ten molds upon two cars coupled together and operated as one will receive the entire charge of the converter.

By our invention we thus not only entirely dispense with the labor of the pitmen, the huge pouring-ladle, the cranes for receiving and handling the pouring-ladle, the pit, the lifting-cranes for removing the ingots and molds from the pit and replanting the molds in the pit, but we are also enabled by our invention to perform all the necessary steps and deliver the ingots into the rail-rolling furnace within a period of about ten minutes from the time the steel is poured from the converter into the mold, so that the ingots are still in a very hot condition when delivered into the furnace. For this reason the ingots require less reheating by our invention than by the old process, and a considerable saving in time and fuel is thus effected. Another material advantage incident to our direct-pouring plant is that the molten steel may be more readily kept at the proper temperature and fluidity for pouring in the converter than in the pouring-ladle heretofore in use, and the loss of metal or imperfect ingots incident to any delay in the old process are entirely avoided by our new plant.

In the accompanying drawings, which form a part of this specification, we have shown an apparatus or plant which may be used in practicing our invention, and which we believe is the best means now known to us for practicing the same.

In the drawings similar letters of reference indicate like parts throughout the several figures.

Figure 2:
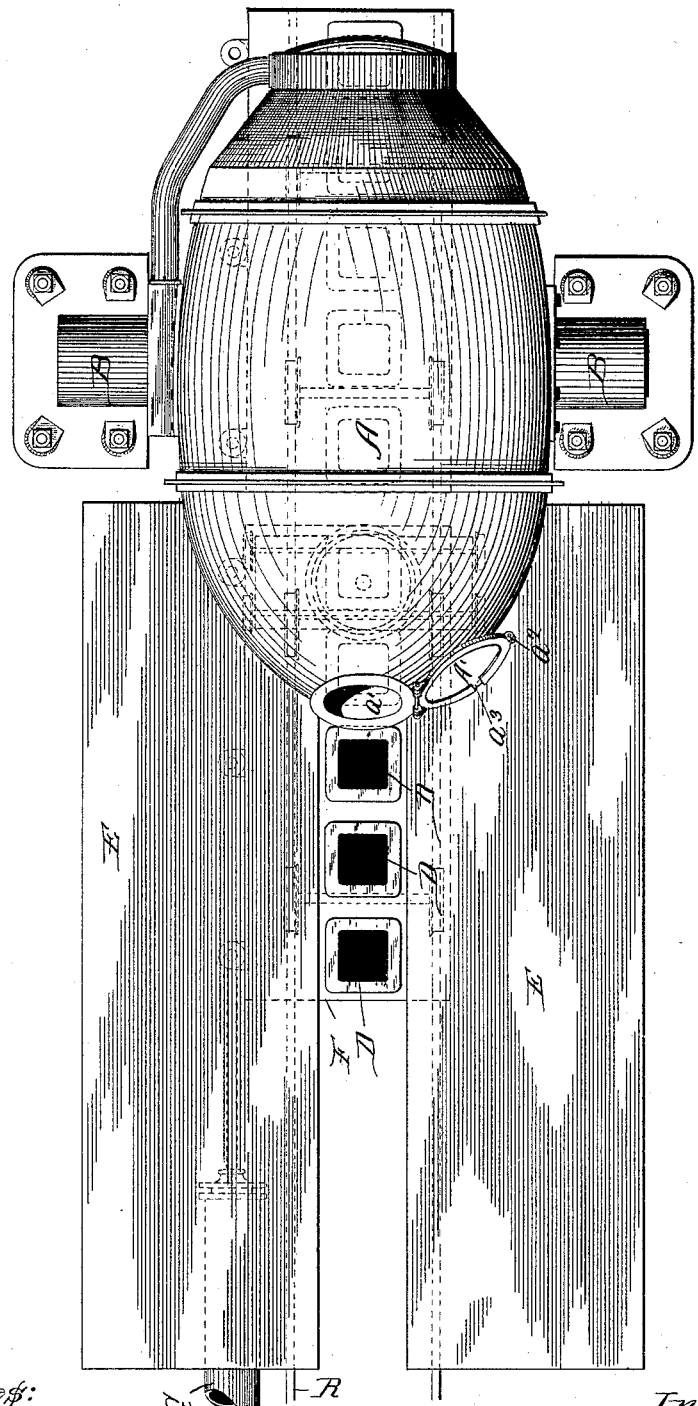
Figure 6:
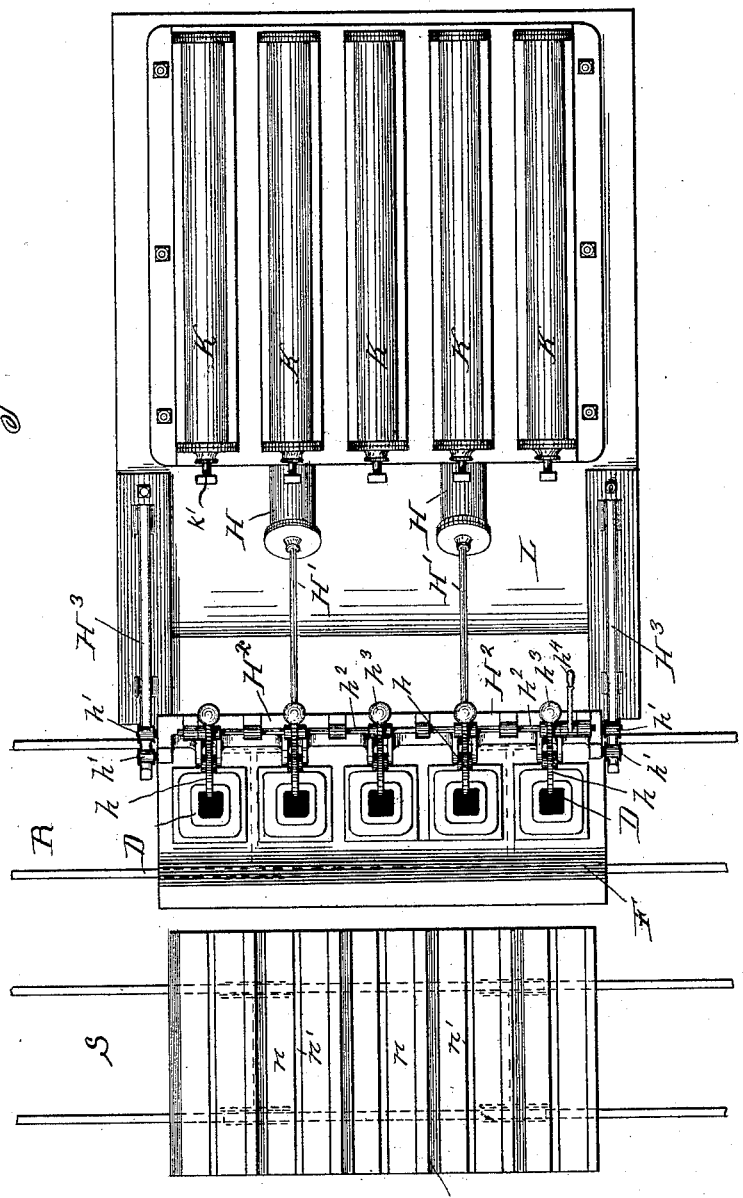

In said drawings, Figure 1 is a plan view showing the mold-car tracks leading from each of the three converters to the stripping plant or device, and from thence to the furnace of the rail-rolling deparment, where the ingots are transferred in the usual way from the furnace-car to the furnace. Fig. 2 is an enlarged plan view showing one of the converters and the molds and mold-cars in dotted lines beneath. Fig. 3 is an end view of the converter. Fig. 4 is a side elevation, partly in longitudinal section, of the mold-cars in position for pouring. Fig. 5 is a detail view showing a runner applied to the pouring bowl or funnel, which is used when the pouring is done from the lip or mouth of the vessel. Fig. 6 is a plan view, Fig. 7 a front elevation, and Fig. 8 a side elevation, of the stripping-plant. Fig. 9 is a side elevation of the furnace-car by which the ingots are conveyed to the furnace of the rail-rolling department, and Fig. 10 is an enlarged side elevation of the hook or device for engaging the end of the mold to incline the same.

In the drawings, A A represent the converters, which are or may be of any well-known construction.

B are the supports upon which the shaft or axis of the converter is journaled and between which it swings from a vertical to a horizontal position, as is required in operation. The converter is swung upon its axis in the usual way by means of a hydraulic ram.

As the construction of the converter and the means for tilting and operating it are well known to those skilled in the art, and do not differ in this respect in our invention from the old process, we do not deem it necessary to describe the same in detail.

C is a small bowl, which answers the purpose of a funnel or runner to guide the stream of metal centrally downward into the mold D as it is poured directly from the converter or vessel A. This bowl or funnel has the customary refractory lining, and is mounted upon an adjustable or movable carriage C', the wheels $c$ of which run in suitable tracks or guides $c'$ on the platforms E.

F is the mold-car upon which the molds D are mounted. The molds are of the usual pyramidal shape, square in cross-section and tapering toward the top. The base-block or bottom D' of each mold is made of cast-iron, like the molds themselves, and fits in a suitable recess or socket $f$, formed in the cast bed-plate F of the mold-car. Each of the molds is connected by a hinge or pivot $d$ to the bed-plate of the mold-car, so that the molds may turn on this pivot. Each mold-car is preferably about twelve feet in length, each being furnished with five molds. Two of them are coupled together and operated as one. The mold-car is moved or adjusted in position under the converter by means of a hydraulic ram G, the piston G' of which has a coupling-head $g$ adapted to be connected by a pin $g'$ to the draw-heads $f'$ at the side of the bed-plate F of the mold-car. The draw-heads $f'$ are preferably three in number on each car, and the piston of the ram may be connected with either draw-head, as may be required from time to time, to move the different molds of the series one after another in position to receive the molten metal.

If the pouring-hole $a$ in the bulge of the vessel should become clogged, the pouring may be done from the lip or mouth $a'$ of the vessel. In this case, however, the bowl C should be provided with a runner $C^2$. In this case, also, we provide, or prefer to provide, the mouth of the converter with a hinged door A', adapted to be securely closed by a lock or bolt $a^2$, so as to withstand the pressure of the molten metal against the same. This door is provided with a pouring slot or opening $a^3$ at or near its lower margin or rim, so that the door may serve to keep back the slag, which floats on top of the molten metal in the converter, and thus permit the molten steel to be drawn off from beneath in the same way as is done when the steel is withdrawn through the hole $a$ in the bulge of the vessel.

H is the inclined hydraulic ram by means of which the molds are tilted from their erect position on the car down into an approximately horizontal position, and by which the molds are again tilted into their vertical position after the ingots have been extracted therefrom by the hydraulic ram K. To facilitate the operation and save time, we prefer to employ a plant of five rams K, arranged side by side, and two inclined rams H, the pistons H' of which are connected by a cross-head $H^2$, so that the entire set of five molds on the car may be simultaneously turned into a horizontal position, and then the ingots simultaneously extracted from them all by the rams K. A single inclined ram H and a single horizontal ram K may, however, be employed, if desired, and each mold operated upon singly in succession.

The piston H' of the inclined ram or its cross-head H² is provided with a hook or grappling device $h$ to engage the mouth of the upper end of the mold, and thus pull it over until its center of gravity passes the pivot $d$, when the end of the mold will rest upon the end of the piston or upon the cross-head H² secured thereto. The cross-head H² travels on inclined guides H³, one at each side, so that all the molds may turn down in the space between the guides. To facilitate the movement of the cross-head H² upon the inclined guides H³, we provide the cross-head with wheels or friction-rollers $h'$. The hook or grappling device $h$ is preferably pivoted at $h^2$, and furnished with a weighted arm $h^3$ to cause it to swing back out of the way after the mold is pulled over, so as to rest upon the piston H' or the cross-head H². This grappling-hook $h$ is preferably also furnished with a handle or lever $h^4$ for operating it. As the end of the piston or cross-head of the inclined jack or ram H must necessarily slide longitudinally on the mold as the mold is lowered into the horizontal position, we provide, or prefer to provide, the same with a friction-roller $h^5$.

L is a stationary platform or support upon which the body of the molds rests when they are turned down into the horizontal position, as shown in Fig. 8. Each of the molds D is furnished with a spur, notch, or projection $d'$ to fit over and engage the support L when the mold is resting thereon, and thus hold the mold against the end-thrust of the ingot-extractor ram K and relieve the mold-car from such thrust.

N is the furnace-car, upon which the ingots are delivered as they are pushed out of the molds of the pistons K' of the hydraulic rams K. The furnace-car N is of the usual construction, and has five transverse troughs $n$ to receive and guide the ingots as they are pushed thereon. The smaller transverse grooves $n'$ of this car are provided to receive under the ingot the tool or device by which the ingot is pushed off of the furnace-car into the furnace of the rail-rolling department, as is well understood by those skilled in the art. One furnace of the rail-rolling department is indicated on Fig. 1 of the drawings at P.

The mold-car track R, which leads to the stripping-plant, is divided into three branches R R' R², one branch extending under each of the three converters. The furnace-car track S extends from the stripping-plant alongside of the mold-car track R to the furnace P. The mold-car may be moved in any suitable manner or by any suitable means from the converter to the stripping-plant; but preferably a small locomotive is employed for this purpose, as well as for moving the furnace-car from the stripping-plant to the furnace.

The carriage C', upon which the bowl or funnel C is mounted, is adjusted in position by the workman, who stands upon the platforms E.

The pouring-hole $a$ in the bulge of the converter A is plugged with clay between each heat or "blow," similar to that used in blast-furnaces. Preparatory to the direct pouring-step the clay plugging in the hole $a$ is picked out in the usual way well known to those skilled in the art.

We claim—

1. The combination, with a rotary converter, of fixed or stationary supports upon and between which it swings, a mold-car carrying a series of molds, and a fixed track for said car extending between said supports and under said converter, and a bowl or funnel C, said bowl or funnel being mounted on an adjustable carriage, and a platform upon which said funnel-carriage travels extending above and parallel to said track, substantially as specified.

2. The combination, with a car having a pivoted mold mounted thereon, of an inclined ram for supporting and lowering the mold into a horizontal position, a support L for the mold to rest upon, and inclined guides for the piston of said ram, substantially as specified.

3. The combination of a converter, a mold-car having a series of molds mounted thereon, a mold-car track extending from the converter to a stripping-plant, and a stripping-plant consisting of an inclined ram furnished with a grappling device for tilting the molds into a horizontal position and a horizontal ram for pushing the ingots out of the molds, substantially as specified.

4. The combination of a converter, a mold-car having a series of molds mounted thereon, a mold-car track extending from the converter to a stripping-plant, consisting of an inclined ram furnished with a grappling device for tilting the molds into a horizontal position, and a horizontal ram for pushing the ingots out of the molds, said molds being hinged or pivoted to the mold-car, substantially as specified.

5. The combination, with a car having a series of pivoted molds mounted thereon, of a pair of inclined hydraulic rams, a cross-head connecting the same, whereby the whole series of said molds may be simultaneously lowered, and inclined guides for said cross-head to travel on, said cross-head being furnished with grappling devices to engage said molds, substantially as specified.

6. The combination, with a mold-car having a series of molds mounted thereon, of an inclined ram H, having a grappling device, and a horizontal ram K, substantially as specified.

7. The combination, with a mold-car having a series of molds mounted thereon, of an inclined ram H, having a grappling device, a horizontal ram K, and a support L, said molds having holding notches or projections $d$ to engage said support, substantially as specified.

8. The combination, with a mold-car having a series of molds mounted thereon, of an inclined ram H, having a grappling device, and a horizontal ram K, a track upon which said mold-car travels, and a second track adjacent thereto for another car, so that the act of pushing the ingots out of the molds will deliver the same upon said car, substantially as specified.

9. The combination, with a car having a series of pivoted molds mounted thereon, of an inclined ram having a piston furnished with a hook or grappling device at its upper end adapted to engage the upper end of the mold, substantially as specified.

10. The combination, with a car having a series of pivoted molds mounted thereon, of an inclined ram having a piston furnished with a hook or grappling device at its upper end adapted to engage the upper end of the mold, and inclined guides for said piston, substantially as specified.

11. The combination, with a car having a pivoted mold mounted thereon, of an inclined ram for supporting and gradually lowering the mold in a horizontal position, and a support L for the mold to rest upon, said mold having a holding notch or projection adapted to engage said support, and a horizontal ingot-extractor ram, substantially as specified.

12. The combination, with a car having a series of pivoted molds mounted thereon, of a pair of inclined hydraulic rams, and a cross-head connecting the same, whereby the whole series of said molds may be simultaneously lowered, said cross-head being furnished with hooks or grappling devices, substantially as specified.

13. The combination, with a car having a series of pivoted molds mounted thereon, of a pair of inclined hydraulic rams, a cross-head connecting the same, whereby the whole series of said molds may be simultaneously lowered, said cross-head being furnished with hooks or grappling devices, and inclined guides for said cross-head to travel on, substantially as specified.

14. The combination of converter A, platform E, bowl or funnel C, its carriage C' and track c' on said platform E, mold-car F and molds D mounted thereon, and hydraulic ram G, having piston G' furnished with coupling-head g, substantially as specified.

15. The combination of a converter, a mold-car having a series of molds mounted thereon, a mold-car track extending from the converter to a stripping-plant, and a stripping-plant consisting of an inclined ram furnished with a grappling device for tilting the mold into a horizontal position and a horizontal ram for pushing the ingots out of the molds, and a furnace-car and furnace-track adjacent to said stripping-plant, said horizontal ram operating to push the ingot out of the mold and onto the furnace-car, substantially as specified.

16. The combination of a converter, a mold-car having a series of molds mounted thereon, a mold-car track extending from the converter to a stripping-plant consisting of an inclined ram furnished with a grappling device for tilting the molds into a horizontal position and a horizontal ram for pushing the ingots out of the molds, said molds being hinged or pivoted to the mold-car, and a furnace-car and furnace-track adjacent to said stripping-plant, said horizontal ram operating to push the ingot out of the mold and onto the furnace-car, substantially as specified.

CROSSLEY LAW.
CHARLES E. HOWE.

Witnesses:
H. M. MUNDAY,
EDMUND ADCOCK.